DATA PROCESSING SYSTEM HAVING VARIABLE CHARACTER LENGTH

Filed Sept. 23, 1966

INVENTOR.
JOHN F. COULEUR
BY
ATTORNEYS.

United States Patent Office 3,483,526
Patented Dec. 9, 1969

3,483,526

DATA PROCESSING SYSTEM HAVING VARIABLE CHARACTER LENGTH

John F. Couleur, Phoenix, Ariz., assignor to General Electric Company, a corporation of New York Filed Sept. 23, 1966, Ser. No. 581,467
Int. Cl. G11b *13/00;* G06f *1/00*
U.S. Cl. 340—172.5 4 Claims

ABSTRACT OF THE DISCLOSURE

A data processing system having a plurality of subsystems, including a data processor, a memory, and an input/output controller, the latter for connection to and control of a plurality of input/output devices. All of the subsystems communicate through a memory controller which acts as a communications hub for the transmission and receipt of information, including data, commands, instructions and codes. The system utilizes a predetermined format of data words and instruction words, each of the words comprising a plurality of binary digits. The size of the words is variable by grouping the digits into characters of different binary digit lengths. The memory includes a memory register which is connected to a gate which also receives inputs from a zone register, the contents of which determine the binary digit length of the characters in each word.

The present invention pertains to data processing systems, and more specifically, to those systems utilizing control means for controlling communication among the subsystems of the data processing system and wherein the control means recognizes illegal actions attempted by the subsystems.

A data processing system includes a data processor for manipulating data in accordance with the instructions of a program. The processor will receive an instruction, decode the instruction, and perform the operation indicated thereby. The operation is performed upon data received by the processor and temporarily stored thereby during the operation. The series of instructions are called a program and include decodable operations to be performed by the processor. The instructions of the program are obtained sequentially by the processor and, together with the data to be operated upon, are stored in memory devices.

The memory device may form any of several well-known types; however, most commonly, the main memory is a random access coincident current type having discrete addressable locations each of which provides storage for a word. The word may form data or instructions and may contain specific fields useful in a variety of operations. Normally, when the processor is in need of data or instructions it will generate a memory cycle and provide an address to the memory. The data or word stored at the addressed location will subsequently be retrieved and provided to the data processor.

A series of instructions comprising a program are usually "loaded" into the memory at the beginning of operation and thus occupies a "block" of memory which normally must not be disturbed until the program has been completed. Data to be operated upon by the processor in accordance with the instructions of the stored program is stored in other areas of memory and is retrieved and replaced in accordance with the decoded instructions.

Communication with the data processing system usually takes place through the media of input/output devices including such apparatus as magnetic tape handlers, paper tape readers, punch card readers, remote terminal devices (for time sharing and real-time application specific terminal devices may be designed to gain access to the data processing system). To control the receipt of information from input/output devices and to coordinate the transfer of information to and from such devices, an input/output control means is required. Thus, an input/output controller is provided and connects the data processing system to the variety of input/output devices. The input/output controller coordinates the information flow to and from the various input/output devices and also awards priority when more than one input/output device is attempting to communicate with the data processing system. Since input/output devices are usually electromechanical in nature and necessarily having much lower operating speed than the remainder of the data processing system, the input/output controller provides buffering to enable the processing system to proceed at its normal rate without waiting for the time consuming communication with the input/output device.

The data processing system thus described includes a processor, a memory, an input/output controller, and input/output devices. In many applications it may be found to be advantageous to utilize more than one processor and under most circumstances more than one block of memory may be used. Further, in those system configurations requiring a large number of input/output devices, a number of input/output controllers may be used each controlling a plurality of input/output devices.

To provide flexibility and also to coordinate the communication among the processor, memory device, and input/output output controller, a memory controller may be utilized. A memory controller is the sole means of communication among the subsystems of the data processing system and receives requests for access to memory as well as specific requests for communication to other subsystems. The memory controller provides a means for coordinating the execution of operations and transfers of information among the subsystems and may also provide a means for awarding priority when accesses to memory are requested by more than one subsystem.

In a data processing system it is customary to utilize a predetermined word length; that is, a word having a predetermined number of binary digits. The words are conveniently divided into characters each having particular significance in a chosen code. While the word length is generally fixed in a given system (with the exception of double precision operations wherein the word length is doubled) it is frequently desirable to either vary the digit length of the characters comprising the word or to vary the number of characters per word.

The simple selection of a predetermined sector of a word has previously been suggested; however, the variability afforded by the system of the present invention in regard to the size of the sector or portion of the word being addressed or manipulated provides substantial increased flexibility. The present system contemplates the utilization of a word having a predetermined number of binary digits and a variable number and size of characters. The present illustration is based upon a data word of thirty-six bits which may comprise six—6 bit characters or 4—9 bit characters. The selection of the specific character together with the size of the character is determined by the interaction of a zone register with a memory register and with the gating of information to the memory register.

It is therefore an object of the present invention to provide a data processing system wherein a data word, having a predetermined binary digit length, may utilize characters of variable length.

It is another object of the present invention to provide a data processing system including means for selecting and manipulating data words having a variable number of characters.

It is another object of the present invention to provide a data processing system wherein a zone register is utilized to determine the number of binary digits in specific characters to be read into or read from a memory register.

It is a further object to provide a data processing system having a gating arrangement electrically positioned between a zone register and memory register wherein information from an information source or from a memory may be gated into the memory register in accordance with the contents of the zone register.

These and other objects of the present invention will become apparent to those skilled in the art as the description proceeds.

Certain portions of the apparatus herein disclosed are not of my invention, but are the invention of John F. Couleur, Richard L. Ruth, and William A. Shelly, as defined by the claims of their application, Ser. No. 584,801, filed Oct. 6 1966, said application being assigned to the assignee of the present application.

DESCRIPTION OF FIGURES

The present invention may more readily be described by reference to the accompanying drawings in which.

Figure 1:
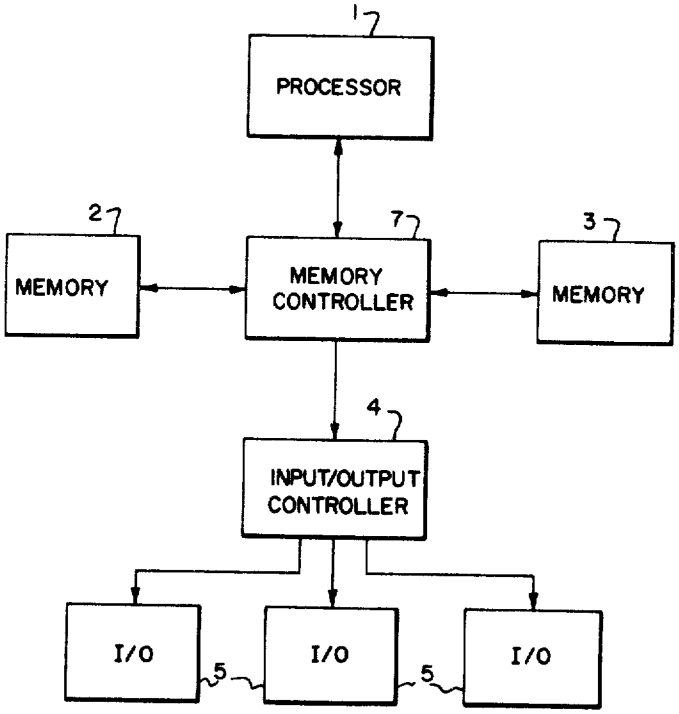
FIGURE 1 is a block diagram of a data processing system in a single memory controller configuration.

For a complete description of the system of FIGURE 1 and of my invention, reference is made to U.S. Patent No. 3,413,613 issued to David L. Bahrs, John F. Couleur, Richard L. Ruth, and William A. Shelly, on Nov. 26, 1968, and assigned to the assignee of the present invention. More particularly attention is directed to FIGURES 2–120 and to the specification beginning at column 4, line 32 and ending at column 121, line 42 inclusive of U.S. Patent No. 3,413,613 which are incorporated herein by reference and made a part hereof.

What is claimed is:

1. In a data processing system having a source of information in the form of data words and instruction words to be stored, said words comprising a plurality of binary digits, and having a memory device for receiving, storing and delivering said words, means for grouping said digits into characters of different predetermined binary digit lengths, said means comprising: a memory register connected to said memory device and including a plurality of memory register storage devices each for temporarily storing one binary digit; a plurality of gates each connected to a different one of said memory register storage devices; a zone register including a plurality of zone storage devices each connected to a different one of said gates and each capable of assuming a predetermined stable condition; means connecting said memory device and said information source to said gates; each of said gates responsive to the predetermined stable condition of a connected zone storage device for enabling information to be loaded into a connected memory register storage device from one of said information source and memory device.

2. In a data processing system having a source of information in the form of data words and instruction words to be stored, said words comprising a plurality of binary digits, and having a memory device for receiving, storing and delivering said words, means for grouping said digits into characters of different predetermined binary digit lengths, said means comprising: a memory register connected to said memory device and including a plurality of memory register flip-flops each for temporarily storing one binary digit; a plurality of gates each connected to a different one of said memory register flip-flops; a zone register including a plurality of zone flip-flops each connected to a different one of said gates and each capable of assuming a predetermined stable condition; means connecting said memory device and said information source to said gates; each of said gates responsive to the predetermined stable condition of a connected zone flip-flop for enabling information to be loaded into a connected memory register flip-flop from one of said information source and memory device.

3. In a data processing system having a source of information in the form of data words and instruction words to be stored, said words comprising a plurality of binary digits, and having a memory device for receiving, storing and delivering said words, means for grouping said digits into characters of different predetermined binary digit lengths, said means comprising: a memory register connected to said memory device and including a plurality of memory register storage devices each for temporarily storing one binary digit; a plurality of gates each connected to a different one of said memory register storage devices; a zone register including a plurality of zone storage devices each connected to a different one of said gates and each capable of assuming a first and second predetermined stable condition; means connecting said memory device and said information source to said gates; each of said gates responsive to the first predetermined stable condition of a connected zone storage device for enabling information to be loaded into a connected memory register storage device from said information source and responsive to the second predetermined stable condition of a connected zone storage device for enabling information to be loaded into a connected memory register storage device from said memory device.

4. In a data processing system having a source of information in the form of data words and instruction words to be stored, said words comprising a plurality of binary digits, and having a memory device for receiving, storing and delivering said words, means for grouping said digits into characters of different predetermined binary digit lengths, said means comprising: a memory register connected to said memory device and including a plurality of memory register flip-flops each for temporarily storing one binary digit; a plurality of gates each connected to a different one of said memory register flip-flops; a zone register including a plurality of zone flip-flops each connected to a different one of said gates and each capable of assuming a first and second predetermined stable condition; means connecting said memory device and said information source to said gates; each of said gates responsive to the first predetermined stable condition of a connected zone flip-flop for enabling information to be loaded into a connected memory register flip-flop from said information source and responsive to the second predetermined stable condition of a connected zone flip-flop for enabling information to be loaded into a connected memory register flip-flop from said memory device.

References Cited

UNITED STATES PATENTS

| | | | |
|---|---|---|---|
| 3,012,230 | 12/1961 | Galas et al. | 340—172.5 |
| 3,166,668 | 1/1965 | Marsh | 235—157 |
| 3,310,786 | 3/1967 | Rinaldi et al. | 340—172.5 |

PAUL J. HENON, Primary Examiner

R. B. ZACHE, Assistant Examiner